US009267858B2

(12) United States Patent
Tanaka et al.

(10) Patent No.: US 9,267,858 B2
(45) Date of Patent: Feb. 23, 2016

(54) DIFFERENTIAL PRESSURE SENSOR

(71) Applicant: Azbil Corporation, Tokyo (JP)

(72) Inventors: Tatsuo Tanaka, Tokyo (JP); Yoshiyuki Ishikura, Tokyo (JP)

(73) Assignee: AZBIL CORPORATION, Tokyo (JP)

( * ) Notice: Subject to any disclaimer, the term of this patent is extended or adjusted under 35 U.S.C. 154(b) by 130 days.

(21) Appl. No.: 14/091,770

(22) Filed: Nov. 27, 2013

(65) Prior Publication Data

US 2014/0144243 A1 May 29, 2014

(30) Foreign Application Priority Data

Nov. 29, 2012 (JP) .................................. 2012-260919

(51) Int. Cl.
*G01L 13/02* (2006.01)
(52) U.S. Cl.
CPC .................................... *G01L 13/025* (2013.01)
(58) Field of Classification Search
CPC .......... G01L 13/02; G01L 13/025; G01L 7/00
USPC ............................ 73/700, 715, 716, 721, 706
See application file for complete search history.

(56) References Cited

U.S. PATENT DOCUMENTS

| 4,086,815 | A | * | 5/1978 | Asano et al. ..................... 73/721 |
| 6,901,803 | B2 | * | 6/2005 | Fandrey ........................... 73/706 |
| 7,360,431 | B2 | | 4/2008 | Yoneda et al. |
| 2005/0072242 | A1 | | 4/2005 | Fandrey |
| 2006/0272422 | A1 | | 12/2006 | Yoneda et al. |

FOREIGN PATENT DOCUMENTS

| JP | 2005-69736 A | 3/2005 |
| JP | 2007-524084 | 8/2007 |

OTHER PUBLICATIONS

Korean Office Action dated Sep. 30, 2014, which issued during prosecution of Korean Application No. 10-2013-0143927, which corresponds to the present application.

* cited by examiner

*Primary Examiner* — Lisa Caputo
*Assistant Examiner* — Nathaniel T Woodward
(74) *Attorney, Agent, or Firm* — Troutman Sanders LLP

(57) ABSTRACT

A differential pressure sensor includes a sensor chip provided with a sensor diaphragm, a first retaining member bonded facing a peripheral edge portion of one face of the sensor diaphragm and having a first pressure guiding hole guiding a first fluid pressure to the one face of the sensor diaphragm, and a second retaining member bonded facing a peripheral edge portion of the other face of the sensor diaphragm and having a second pressure guiding hole guiding a second fluid pressure to the other face of the sensor diaphragm. The differential pressure sensor also includes a sensor housing having a sensor chamber containing the sensor chip, a first pressure guiding duct guiding the first fluid pressure to a first inner wall face of the sensor chamber, and a second pressure guiding duct guiding the second fluid pressure to a second inner wall face of the sensor chamber.

4 Claims, 6 Drawing Sheets

Background Art

Background Art

Background Art

Background Art

DIFFERENTIAL PRESSURE SENSOR

CROSS REFERENCE TO RELATED APPLICATION

This application claims priority under 35 U.S.C. §119 to Japanese Patent Application No. 2012-260919, filed on Nov. 29, 2012, the entire content of which being hereby incorporated herein by reference.

FIELD OF TECHNOLOGY

The present invention relates to a differential pressure sensor that uses a sensor diaphragm for outputting a signal in accordance with a pressure.

BACKGROUND

Conventionally, differential pressure sensors that use sensor diaphragms for outputting signals in accordance with pressure differences have been used as differential pressure sensors for industrial use. These differential pressure sensors are structured so as to guide the respective measurement pressures, which will act on high-pressure-side and low-pressure-side pressure bearing diaphragms, to one side face and the other side face of a sensor diaphragm, through a filling liquid as a pressure transmitting medium, so as to detect the deformation of the sensor diaphragm as, for example, a change in a resistance value of a strain resistance gauge, to convert this change in the resistance value into an electric signal, so as to be outputted to the outside.

This type of differential pressure sensor is used when measuring, for example, a liquid surface height through detecting a pressure difference between two locations, upper and lower, within a sealed tank for storing a fluid that is to be measured, such as a high-temperature reaction tower in an oil refining plant.

FIG. 3 is illustrates a schematic structure for a conventional differential pressure sensor. This differential pressure sensor 100 is structured through incorporating, in a meter body 2, a sensor chip 1 having a sensor diaphragm (not shown). The sensor diaphragm in the sensor chip 1 is made from silicon, glass, or the like, and a strain resistance gauge is formed on a surface of the diaphragm, which is formed in a thin plate shape. The meter body 2 is structured from a main unit portion 3, made out of metal, and a sensor portion 4, where a pair of barrier diaphragms (pressure bearing diaphragms) 5a and 5b, which are pressure bearing portions, is provided on a side face of the main unit portion 3, and the sensor chip 1 is provided within a sensor chamber 4a of the sensor portion 4.

In the meter body 2, the pressure sensor chip 1 that is provided within the sensor chamber 4a of the sensor portion 4 is connected to the barrier diaphragms 5a and 5b that are provided in the main unit portion 3 through respective pressure buffering chambers 7a and 7b, which are separated by a large-diameter center diaphragm 6, and pressure transmitting media 9a and 9b, such as silicone oil, or the like, are filled into connecting ducts 8a and 8b, which connect the sensor chip 1 to the barrier diaphragms 5a and 5b.

Note that the pressure transmitting medium, such as the silicone oil, is required because it is necessary to separate the strain (pressure)-sensitive sensor diaphragm from the corrosion-resistant pressure bearing diaphragms, in order to prevent foreign materials within the measurement medium from becoming adhered to the sensor diaphragm, and to prevent corrosion of the sensor diaphragm.

In this differential pressure sensor 100, a measurement pressure P1 from a process is applied to the barrier diaphragm 5a, and a measurement pressure P2, from the process, is applied to the barrier diaphragm 5b, as in the operating state during proper operation that is illustrated schematically in FIG. 4(a). As a result, the barrier diaphragms 5a and 5b undergo dislocation, and the pressures P1 and P2 that are applied thereto are directed to the one face and the other face of the sensor diaphragm of the sensor chip 1, by the pressure transmitting media 9a and 9b, through pressure buffering chambers 7a and 7b that are divided by the center diaphragm 6. The result is that the sensor diaphragm of the sensor chip 1 undergoes dislocation in accordance with the pressure differential ΔP between the pressures P1 and P2 that are directed thereto.

In contrast, if, for example, an excessively large pressure Pover is applied to the barrier diaphragm 5b, then, as illustrated in FIG. 4(b), the barrier diaphragm 5b undergoes a large dislocation, and the center diaphragm 6 undergoes dislocation in accordance therewith so as to absorb the excessively large pressure Pover. Given this, the barrier diaphragm 5b bottoms out on the bottom face (an excessive pressure guard face) of a recessed portion 10b of the meter body 2, controlling the dislocation thereof, and preventing the propagation of a greater differential pressure ΔP than that to the sensor diaphragm through the barrier diaphragm 5b. When an excessively large pressure Pover is applied to the barrier diaphragm 5a as well, as with the case wherein an excessively large pressure Pover is applied to the barrier diaphragm 5b, the barrier diaphragm 5a bottoms out on the bottom face (an excessive pressure guard face) of a recessed portion 10a of the meter body 2, controlling the dislocation thereof, and preventing the propagation of a greater differential pressure ΔP than that to the sensor diaphragm through the barrier diaphragm 5a. The result is that breakage of the sensor chip 1, that is, breakage of the sensor diaphragm in the sensor chip 1, due to the application of an excessively large pressure Pover is prevented in advance.

In this differential pressure sensor 100, the sensor chip 1 is enclosed within the meter body 2, thus making it possible to protect the sensor chip 1 from the outside corrosive environment, such as the process fluid. However, because the structure is one wherein the center diaphragm 6 and the recessed portions 10a and 10b are provided for controlling the dislocation of the barrier diaphragms 5a and 5b to protect the sensor chip 1 from excessively large pressures Pover thereby, the dimensions thereof unavoidably must be increased.

Given this, there has been a proposal for a structure for preventing breakage/rupture of the sensor diaphragm through preventing excessive dislocation of the sensor diaphragm, when an excessively large pressure is applied, through the provision of a first stopper member and a second stopper member in the sensor chip, and having recessed portions of the first stopper member and the second stopper member face the one face side and the other face side of the sensor diaphragm. See, for example, Japanese Unexamined Patent Application Publication No. 2005-69736 ("the JP '736").

FIG. 5 illustrates schematically a sensor chip that uses the structure illustrated in the JP '736. In this figure: 11-1 is a sensor diaphragm; 11-2 and 11-3 are first and second stopper members that are bonded with the sensor diaphragm 11-1 interposed therebetween; and 11-4 and 11-5 are pedestals to which the stopper members 11-2 and 11-3 are bonded. The stopper members 11-2 and 11-3 and the pedestals 11-4 and 11-5 are structured from silicon, glass, or the like.

In this sensor chip 11, recessed portions 11-2a and 11-3a are formed in the stopper members 11-2 and 11-3, where the recessed portion 11-2a of the stopper member 11-2 faces the one face of the sensor diaphragm 11-1, and the recessed portion 11-3a of the stopper member 11-3 faces the other face of the sensor diaphragm 11-1. The recessed portions 11-2a and 11-3a have surfaces that are curved along the dislocation of the sensor diaphragm 11-1, where pressure guiding holes 11-2b and 11-3b are formed at the apex portions thereof. Pressure introducing holes (pressure guiding holes) 11-4a and 11-5a are formed in the pedestals 11-4 and 11-5 as well, at positions corresponding to those of the pressure guiding holes 11-2b and 11-3b of the stopper members 11-2 and 11-3.

When such a sensor chip 11 is used, then when there is a displacement of the sensor diaphragm 11-1 when an excessively large pressure is applied to the one face of the sensor diaphragm 11-1, the entirety of the dislocated face is supported and stopped by the curved surface of the recessed portion 11-3a of the stopper member 11-3. Moreover, then when there is a displacement of the sensor diaphragm 11-1 when an excessively large pressure is applied to the other face of the sensor diaphragm 11-1, the entirety of the dislocated face is supported and stopped by the curved surface of the recessed portion 11-2a of the stopper member 11-2.

This effectively prevents accidental rupturing of the sensor diaphragm 11-1 due to the application of an excessively large pressure, through preventing excessive dislocation when an excessively large pressure is applied to the sensor diaphragm 11-1, thus enabling an increase in the excessively large pressure guard operating pressure (withstand pressure). Moreover, in the structure illustrated in FIG. 3, the center diaphragm 6 and the pressure buffering chambers 7a and 7b are eliminated, and the measurement pressures P1 and P2 are guided directly from the barrier diaphragms 5a and 5b the sensor diaphragm 11-1, thus making it possible to achieve a reduction in the size of the meter body 2.

In a structure by which to achieve a reduction in size of this meter body 2, the sensor chip 11, as illustrated in FIG. 6, is contained within a sensor chamber 4a and is secured through bonding a pedestal 11-5 to the bottom face (wall face) 4b of the sensor chamber 4a. In this case, the measurement pressures P1 and P2 are applied, and the sensor diaphragm 11-1 flexes to the low-pressure side depending on the differential pressure ΔP between the measurement pressures P1 and P2. This flexing preferably is toward the bonded portion with the wall face 4b of the sensor chamber 4a of the sensor chip 11. If flexing were produced in the opposite direction, then the sensor chip 11 might delaminate from the bonded portion with the wall face 4b of the sensor chamber 4a. The bonded portion is pressed with a force F1 that depends on the product (S·P1) of the measurement pressure P1 and the surface area S that is formed by the outer periphery of the bonded portion of the wall face 4b and the sensor chamber 4a. On the other hand, the bonded portion is pulled apart by a force F2 in accordance with the product (X·P2) of the measurement pressure P2 and the non-bonded surface area X that is in communication with the measurement pressure P2 and that is surrounded by the bonded portion that is bonded to the wall face 4b of the sensor chamber 4a. If the sum of F1 and the force F3 with which the bonded portion is supported by the bond alone is not greater than F2, then the bond will delaminate. If the surface area S is, in the deformation thereof, greater than the surface area X, and P1 is greater than P2, then there will be no delamination. Moreover, the same relationship exists for, for example, the bonded portion for the stopper member 11-3 with the sensor diaphragm 11-1 within the sensor chip 11. Because of this, normally the side that bears the pressure P1 is used as the high-pressure side and the side that bears the pressure P2 is used as the low-pressure side.

However, in such a structure for the sensor chip 11, it is not possible to prevent delamination of the bonded portion of the sensor chip 11 (the bonded portion of the sensor chip 11 bonded to the wall face 4b of the sensor chamber 4a, or the bonded portions of the multilayer structure within the sensor chip 11) by simply establishing a high-pressure side and a low-pressure side if there is the possibility that the high/low relationship between the pressure P1 and the pressure P2 could become reversed or, even if the high/low relationship between the pressure P1 and the pressure P2 is not reversed, the pressure P1 side is selected as the low-pressure side and the pressure P2 side is selected as the high-pressure side through a technician error when installing the differential pressure sensor in the workplace.

The present invention is to solve such a problem, and an aspect thereof is to provide a differential pressure sensor able to prevent delamination of the bonded portion of the sensor chip.

SUMMARY

In order to achieve the aspect set forth above, the present invention provides a differential pressure sensor comprising: a sensor chip provided with at least: a sensor diaphragm for outputting a signal in accordance with a difference in pressures borne by one face and another face; a first retaining member, bonded facing a peripheral edge portion of the one face of the sensor diaphragm, and having a first pressure guiding hole for guiding a first fluid pressure to the one face of the sensor diaphragm; and a second retaining member, bonded facing a peripheral edge portion of the other face of the sensor diaphragm, and having a second pressure guiding hole for guiding a second fluid pressure to the other face of the sensor diaphragm; and a sensor housing having: a sensor chamber for containing the sensor chip; a first pressure guiding duct for guiding the first fluid pressure to a first inner wall face of the sensor chamber; and a second pressure guiding duct for guiding the second fluid pressure to a second inner wall face of the sensor chamber; further comprising: a first connecting member, connected to the one face of the sensor chip, having a first connecting hole that is connected to the first pressure guiding hole; a second connecting member, connected to the other face of the sensor chip, having a second connecting hole that is connected to the second pressure guiding hole; a first pressure guiding tube, having one end that is secured in the first connecting hole of the first connecting member, and the other end secured in the first pressure guiding duct of the sensor housing; and a second pressure guiding tube, having one end that is secured in the second connecting hole of the second connecting member, and the other end secured in the second pressure guiding duct of the sensor housing; wherein: a first pressure transmitting medium, for guiding the first fluid pressure to the one side of the sensor diaphragm, is sealed in the tube of the first pressure guiding tube, as a portion of a sealed chamber; and a second pressure transmitting medium, for guiding the second fluid pressure to the other side of the sensor diaphragm, is sealed in the tube of the second pressure guiding tube, as a portion of a sealed chamber.

In the present invention, the sensor chip is held between the first connecting member and the second connecting member, where the first fluid pressure is received through a first pressure guiding tube that has one end secured in a first connecting hole of the first connecting member, and the second fluid pressure is received through a second pressure guiding tube that has one end secured in a second connecting hole of the second connecting member. That is, a first pressure transmitting medium that is sealed within the tube of the first pressure guiding tube transmits the first fluid pressure to one face of the sensor diaphragm, and a second pressure transmitting medium that is sealed within the tube of the second pressure guiding tube transmits the second fluid pressure to the other face of the sensor diaphragm.

In this case, the other end of the first pressure guiding tube is secured connected to the first pressure guiding duct of the sensor housing, and the other end of the second pressure guiding tube is secured connected to the second pressure guiding duct of the sensor housing, so that regardless of how the high/low relationship is for the pressures of the first fluid pressure and the second fluid pressure, even if there is a large differential pressure, the sensor chip will be pressed to either the first inner wall face side or the second inner wall face side. As a result, even if the high/low relationship of the pressures for the first fluid pressure and the second fluid pressure were to be reversed, the sensor chip will always be pressed against an inner wall face side of the sensor chamber, thus mitigating the pressure that is applied to the bonded portion of the sensor chip, preventing delamination of the bonded portion of the sensor chip.

Moreover, if, in the present invention, the first connecting member has a first space wherein the opening that connects to the first connecting hole to one side of the sensor chip is wide, and the second connecting member has a second space wherein the opening that connects to the second connecting hole to the other side of the sensor chip is wide, the sensor chip would bear forces, from both sides, in the compressing direction from the first pressure transmitting medium within the first space of the first connecting member and the second pressure transmitting medium within the second space of the second connecting medium, thus suppressing the delamination of the bonded portion of the sensor chip, enabling a further increase in the ability to withstand pressure.

Moreover, if, in the present invention the sensor housing is provided with a first wall face member (a first barrier base) that provides a first inner wall face of the sensor chamber, and a second wall face member (a second barrier base) that provides a second inner wall face of the sensor chamber, so that when there is a change in the volumes of the media through the first and second pressure transmitting media expanding or contracting the first and second wall face members dislocate in directions that mitigate the production of stress due to the change in the volumes of the media, then if heat from the outside were to propagate to the first pressure transmitting medium or the second pressure transmitting medium through the sensor housing, the change in volume due to the expansion or contraction of the first pressure transmitting medium or the second pressure transmitting medium would be absorbed through dislocation of the first wall face member or the second wall face member itself. As a result, thermal stresses on the bonded face of the sensor chip in the shearing direction or tensile direction are mitigated, making it possible to avoid delamination of the bonded portion of the sensor chip not only when there is a high pressure, but when there is a change in ambient temperature as well.

Moreover, if, in the present invention, a first pressure bearing diaphragm (a first barrier diaphragm), for bearing and transmitting the first fluid pressure to the first pressure transmitting medium, and a second pressure bearing diaphragm (a second barrier diaphragm), for bearing and transmitting the second fluid pressure to the second pressure transmitting medium, are provided on the outer peripheral face of the sensor housing, then it becomes possible to achieve integration of the pressure bearing portions for the first and second fluid pressures with the sensor housing, enabling the achievement of a reduction in the size of the differential pressure sensor.

In the present invention, a first connecting member is bonded to one face of a sensor chip, a second connecting member is bonded to the other face of the sensor chip, the other end of a first pressure guiding tube that has one end secured in a first connecting hole of the first connecting member is connected in a first pressure guiding duct of a sensor housing, the other end of a second pressure guiding tube that has one end secured in a second connecting hole of the second connecting member is connected in a second pressure guiding duct of the sensor housing, a first pressure transmitting medium, for guiding a first fluid pressure to one face of the sensor diaphragm is sealed in the tube of the first pressure guiding tube, as a portion of a sealed chamber, and a second pressure transmitting medium, for guiding a second fluid pressure to the other face of the sensor diaphragm is sealed in the tube of the second pressure guiding tube, as a portion of a sealed chamber, and thus the sensor chip is pressed to an inner wall face side of a sensor chamber, regardless of the high/low relationship between the pressures for the first fluid pressure and the second fluid pressure, to mitigate the pressure that is applied to the bonded portion of the sensor chip, thus making it possible to prevent delamination of the bonded portion of the sensor chip.

BRIEF DESCRIPTIONS OF THE DRAWINGS

DETAILED DESCRIPTION

The present invention will be explained in detail below based on the drawings.

Example

Figure 1:
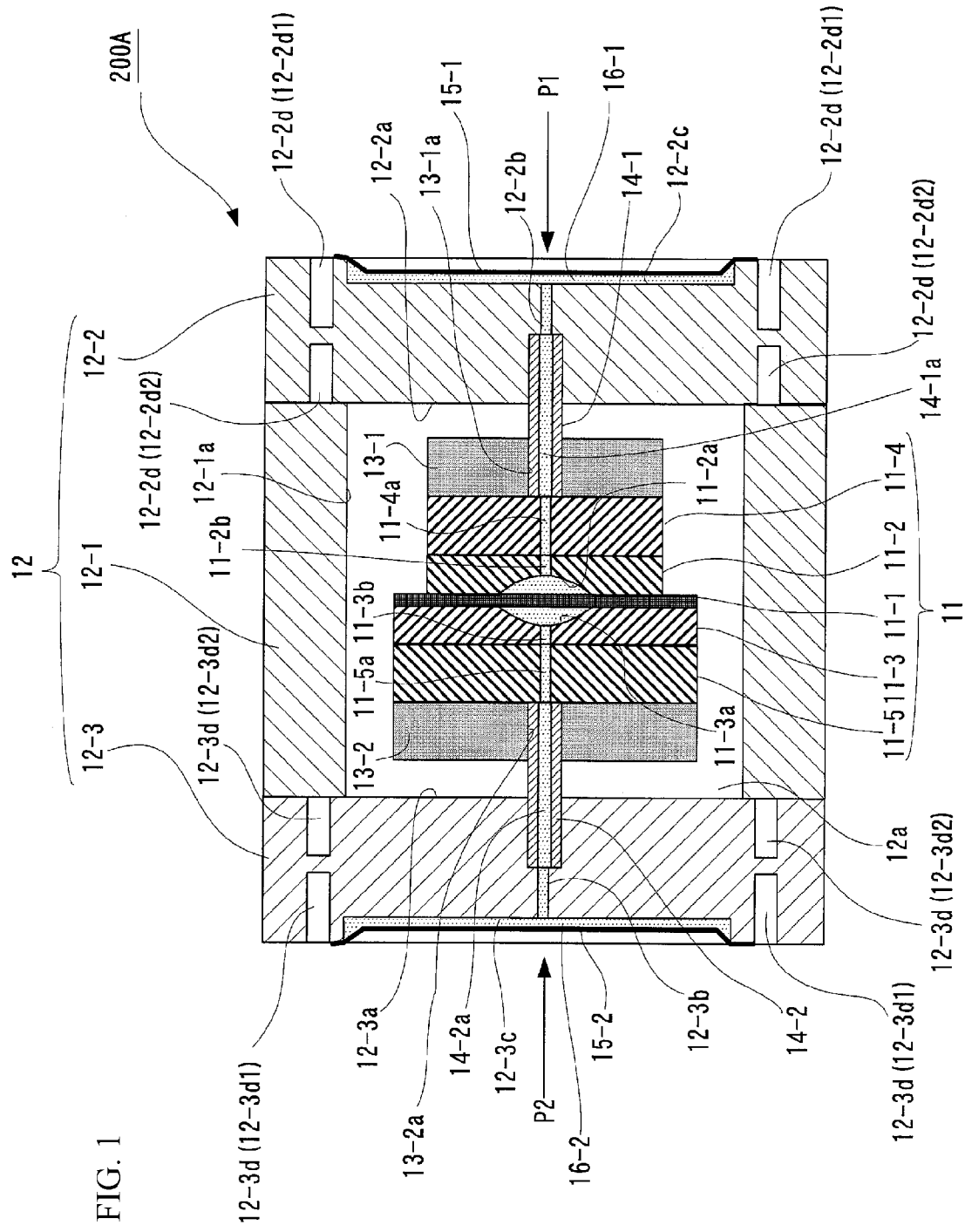
FIG. 1 is a cross-sectional diagram illustrating various portions of Example of a differential pressure sensor according to the present invention.

FIG. 1 is a cross-sectional diagram illustrating various portions of Example of a differential pressure sensor according to the present invention. In this figure, 12 is a sensor housing, structured from a circular tubular ring body 12-1, and circular disc-shaped barrier bases 12-2 and 12-3. The ring body 12-1 and the barrier bases 12-2 and 12-3 are made from, for example, stainless steel.

The barrier base 12-2 is weld-bonded to one open face of the ring body 12-1, and the barrier base 12-3 is weld-bonded to the other open face of the ring body 12-1, where the space enclosed by the inner peripheral face 12-1a of the ring body 12-1 and the inner wall faces 12-2a and 12-3a of the barrier bases 12-2 and 12-3 is defined as a sensor chamber 12a. These barrier bases 12-2 and 12-3 correspond to the first and second wall face members in the present invention.

A sensor chip 11 is contained in the sensor chamber 12a. In the sensor chamber 12a, the sensor base 13-1 is bonded to one face of the sensor chip 11 (the outer face of a pedestal 11-4), and the sensor base 13-2 is bonded to the other face of the sensor chip 11 (the outer face of a pedestal 11-5). The sensor base 13-1 has a connecting hole 13-1a that connects to a pressure guiding hole 11-2b of a stopper member 11-2 through a pressure guiding hole 11-4a of the pedestal 11-4, and the sensor base 13-2 has a connecting hole 13-2a that connects to a pressure guiding hole 11-3b of a stopper member 11-3 through a pressure guiding hole 11-5a of the pedestal 11-5. The sensor bases 13-1 and 13-2 correspond to the first and second connecting members in the present invention.

Moreover, in the sensor chamber 12a, one end of a pressure guiding tube 14-1 is secured (adhesively bonded) in the connecting hole 13-1a of the sensor base 13-1, and the other end of the pressure guiding tube 14-1 is secured (weld-bonded) in a pressure guiding duct 12-2b that is formed in the barrier base 12-2. Moreover, one end of a pressure guiding tube 14-2 is secured (adhesively bonded) in the connecting hole 13-2a of the sensor base 13-2, and the other end of the pressure guiding tube 14-2 is secured (weld-bonded) in a pressure guiding duct 12-3b that is formed in the barrier base 12-3.

A recessed portion 12-2c is formed in the barrier base 12-2, connecting to the pressure guiding duct 12-2b, where a first pressure bearing diaphragm (a first barrier diaphragm (a metal diaphragm)) 15-1 is provided on the front face of the recessed portion 12-2c. Given this, a first pressure transmitting medium 16-1 is sealed into a sealed chamber that is the space on the back face side of the first pressure bearing diaphragm 15-1, that is, the recessed portion 12-2c and the pressure guiding duct 12-2b of the barrier base 12-2, the tube 14-1a of the pressure guiding tube 14-1, the pressure guiding hole 11-4a of the pedestal 11-4, and the pressure guiding hole 11-2b and the recessed portion 11-2a of the stopper member 11-2.

A recessed portion 12-3c is formed in the barrier base 12-3, connecting to the pressure guiding duct 12-3b, where a second pressure bearing diaphragm (a second barrier diaphragm (a metal diaphragm)) 15-2 is provided on the front face of the recessed portion 12-3c. Given this, a second pressure transmitting medium 16-2 is sealed into a sealed chamber that is the space on the back face side of the second pressure bearing diaphragm 15-2, that is, the recessed portion 12-3c and the pressure guiding duct 12-3b of the barrier base 12-3, the tube 14-2a of the pressure guiding tube 14-2, the pressure guiding hole 11-5a of the pedestal 11-5, and the pressure guiding hole 11-3b and the recessed portion 11-3a of the stopper member 11-3.

Moreover, in this differential pressure sensor 200A, ring-shaped grooves 12-2d1 and 12-2d2 are formed at positions facing the front and back faces of the periphery of the pressure bearing diaphragm 15-1 in the barrier base 12-2 (positions overlapping the thickness of the ring body 12-1). Moreover, as with the barrier base 12-2, ring-shaped grooves 12-3d1 and 12-3d2 are formed at positions facing the front and back faces of the periphery of the pressure bearing diaphragm 15-2 in the barrier base 12-3 as well (positions overlapping the thickness of the ring body 12-1).

Note that in the present example, the sensor bases 13-1 and 13-2 are made out of a steel material such as stainless steel, Hastelloy®, or titanium, the pressure guiding tubes 14-1 and 14-2 are made out of stainless steel, and a low-compressibility fluid such as silicone oil is used for the pressure transmitting media 16-1 and 16-2.

In this differential pressure sensor 200A, the fluid pressure P1 that is applied to the pressure bearing diaphragm 15-1 is applied to the one face of the sensor diaphragm 11-1 by the pressure transmitting medium 16-1 through the pressure guiding duct 12-2b of the barrier base 12-2, the tube 14-1a of the pressure guiding tube 14-1, the pressure guiding hole 11-4a of the pedestal 11-4, and the pressure guiding hole 11-2b of the stopper member 11-2. Moreover, the fluid pressure P2 that is applied to the pressure bearing diaphragm 15-2 is applied to the other face of the sensor diaphragm 11-1 by the pressure transmitting medium 16-2 through the pressure guiding duct 12-3b of the barrier base 12-3, the tube 14-2a of the pressure guiding tube 14-2, the pressure guiding hole 11-5a of the pedestal 11-5, and the pressure guiding hole 11-3b of the stopper member 11-3.

In this case, when there is a displacement of the sensor diaphragm 11-1 when an excessively large pressure is applied to the one face of the sensor diaphragm 11-1, the entirety of the dislocated face is supported and stopped by the curved surface of the recessed portion 11-3a of the stopper member 11-3. Moreover, then when there is a displacement of the sensor diaphragm 11-1 when an excessively large pressure is applied to the other face of the sensor diaphragm 11-1, the entirety of the dislocated face is supported and stopped by the curved surface of the recessed portion 11-2a of the stopper member 11-2.

In this differential pressure sensor 200A, the sensor chip 11 is held between sensor bases 13-1 and 13-2, where the fluid pressure P1 is received through the pressure guiding tube 14-1 that has one end thereof secured in the connecting hole 13-1a of the sensor base 13-1, and the fluid pressure P2 is received through the pressure guiding tube 14-2 that has one end thereof secured in the connecting hole 13-2a of the sensor base 13-2. That is, the pressure transmitting medium 16-1 that is sealed into the tube 14-1a of the pressure guiding tube 14-1, as a portion of the sealed chamber, transmits the fluid pressure P1 to the one face of the sensor diaphragm 11-1, and the pressure transmitting medium 16-2 that is sealed into the tube 14-2a of the pressure guiding tube 14-2, as a portion of the sealed chamber, transmits the fluid pressure P2 to the other face of the sensor diaphragm 11-1.

In this case, the other end of the pressure guiding tube 14-1 is secured in the pressure guiding duct 12-2b of the barrier base 12-2 that forms the sensor housing 12, and the other end of the pressure guiding tube 14-2 is secured in the pressure guiding duct 12-3b of the barrier base 12-3 that forms the sensor housing 12, so that regardless of the high/low relationship between the pressures in the fluid pressure P1 and the fluid pressure P2, even if an excessively high differential pressure is produced, the sensor chip 11 will be pressed, by the pressing force caused by the differential pressure, against the inner wall face 12-2a or the inner wall face 12-3a of the sensor chamber 12a. As a result, even if the high/low relationship between the pressures in the fluid pressure P1 and the fluid pressure P2 were reversed, the sensor chip 11 will always be pressed against an inner wall face side of the sensor chamber 12a, mitigating the pressure that is applied to the bonded portion of the sensor chip 11, making it possible to prevent the bonded portion of the sensor chip 11 from delaminating.

Moreover, if, in this differential pressure sensor 200A, heat from the outside were to propagate to the pressure transmitting medium 16-1 or 16-2 through the housing 12, the change in volume due to expansion or contraction of the pressure transmitting medium 16-1 or 16-2 would be absorbed through a dislocation of the barrier base 12-2 or 12-3 itself.

That is, in the differential pressure sensor 200A, ring-shaped grooves 12-2d1 and 12-2d2 are formed, in the barrier base 12-2, at positions that face the front and the back of the periphery of the pressure bearing diaphragm 15-1, and ring-shaped grooves 12-3d1 and 12-3d2 are formed, in the barrier base 12-3, at positions that face the front and the back of the periphery of the pressure bearing diaphragm 15-2. As a result, if the pressure transmitting medium 16-1 or 16-2 were to expand or to contract, changing the volume thereof, then the barrier base 12-2 or 12-3 would work as a pseudo-diaphragm, to be dislocated in the direction that would mitigate the production of stress due to the change in volume of the medium.

In this way, if, in this differential pressure sensor 200A, heat from the outside were to propagate to the pressure transmitting medium 16-1 or 16-2 through the housing 12, the change in volume due to expansion or contraction of the pressure transmitting medium 16-1 or 16-2 would be absorbed through dislocation of the barrier base 12-2 or 12-3 itself, mitigating thermal stresses in the shearing direction and the tensile direction on the bonded face of the sensor chip 11, making it possible to suppress delamination of the bonded portion of the sensor chip 11, not just when there is a high pressure, but also when there is a change in the ambient temperature.

Note that while, in this differential pressure sensor 200A, in the barrier bases 12-2 and 12-3 the ring-shaped grooves 12-2d1 and 12-2d2, and 12-3d1 and 12-3d2 cause the barrier bases 12-2 and 12-3 to act as pseudo-diaphragms for a change in volume due to expansion or contraction of the pressure transmitting media 16-1 and 16-2, the grooves are designed so that the pressure-bearing diaphragms 15-1 and 15-2 will essentially not deform, even when the pressure that is borne is large.

Moreover, in this differential pressure sensor 200A, the pressure bearing diaphragms 15-1 and 15-2 are provided so as to be on the outer peripheral face of the sensor housing 12, thus making it possible to achieve integration of the pressure bearing portions for the fluid pressures P1 and P2 and the sensor housing, thus enabling miniaturization of the differential pressure sensor.

Another Example

Figure 2:
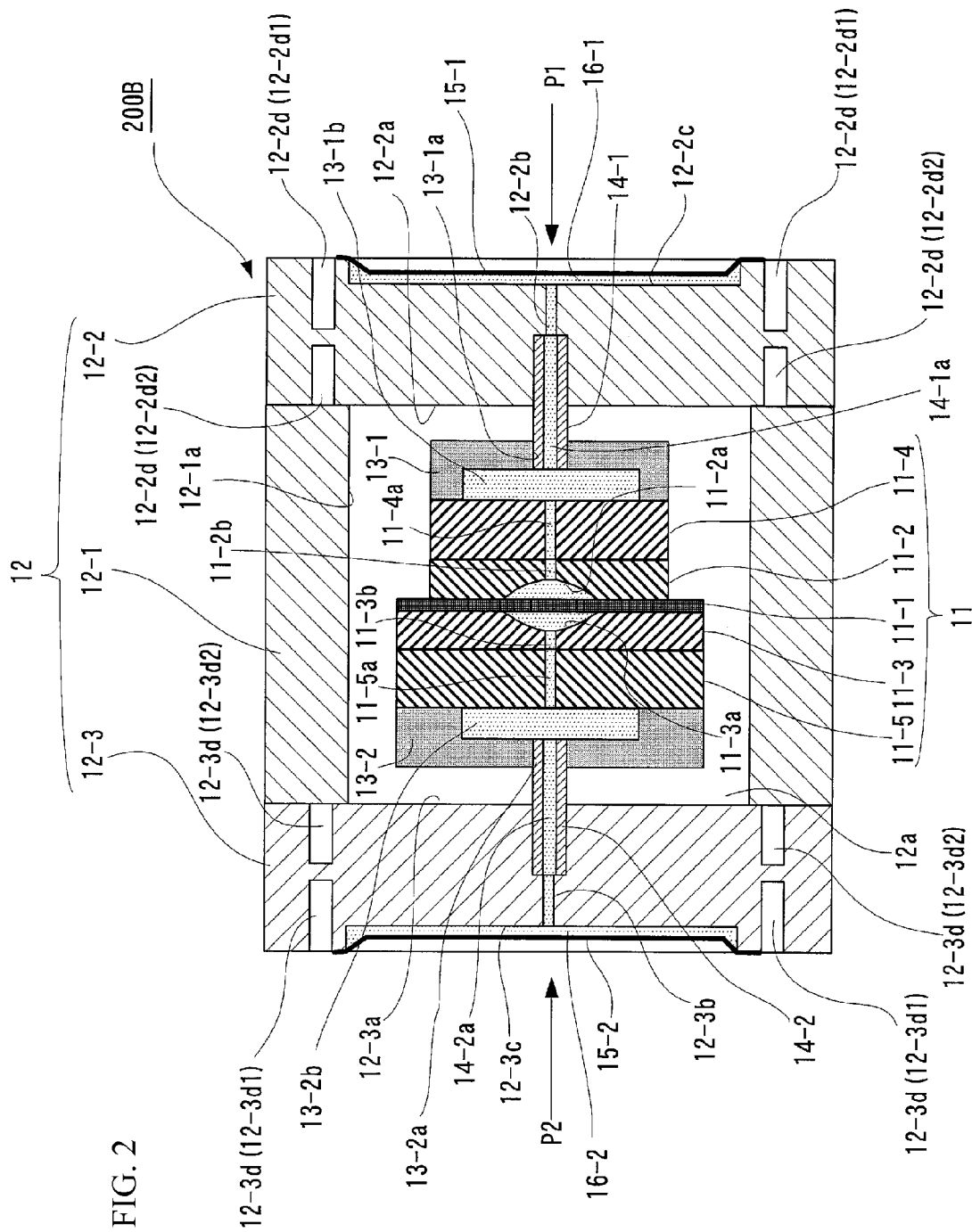
FIG. 2 is a cross-sectional diagram illustrating various portions of Another Example of a differential pressure sensor according to the present invention.
Figure 3:
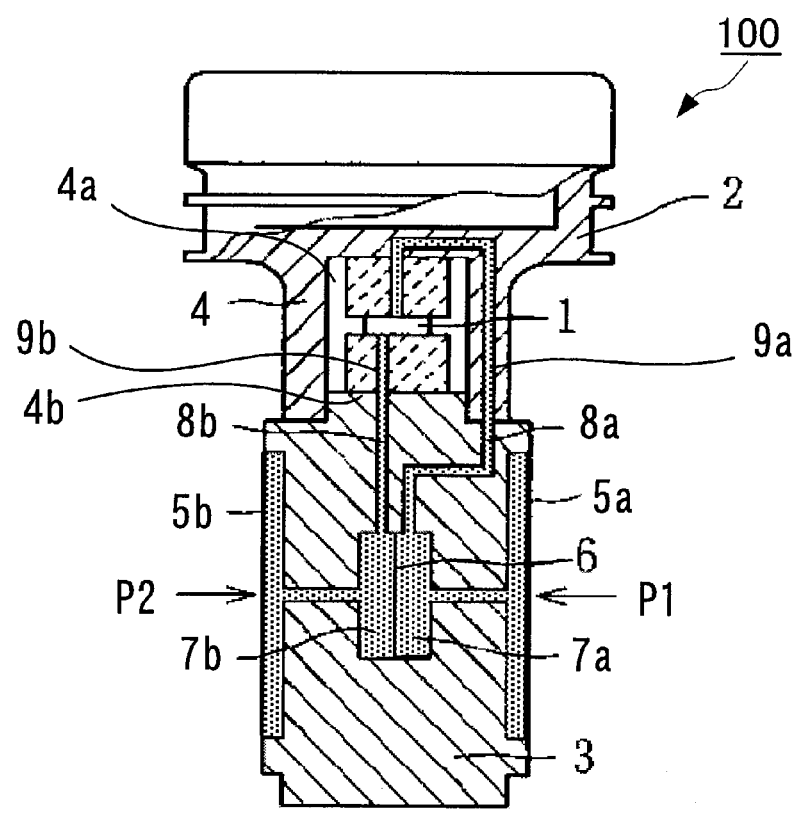
FIG. 3 is a diagram illustrating a schematic structure of a conventional differential pressure sensor.
Figure 4:
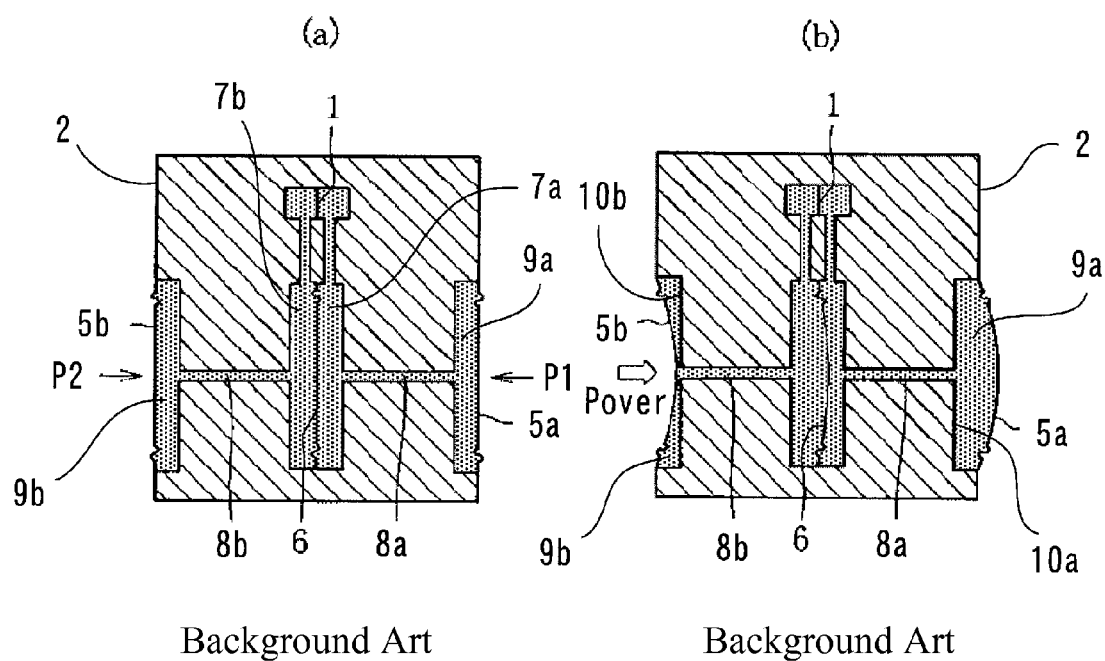
FIG. 4 is a diagram illustrating schematically a state of operation of this differential pressure sensor.
Figure 5:
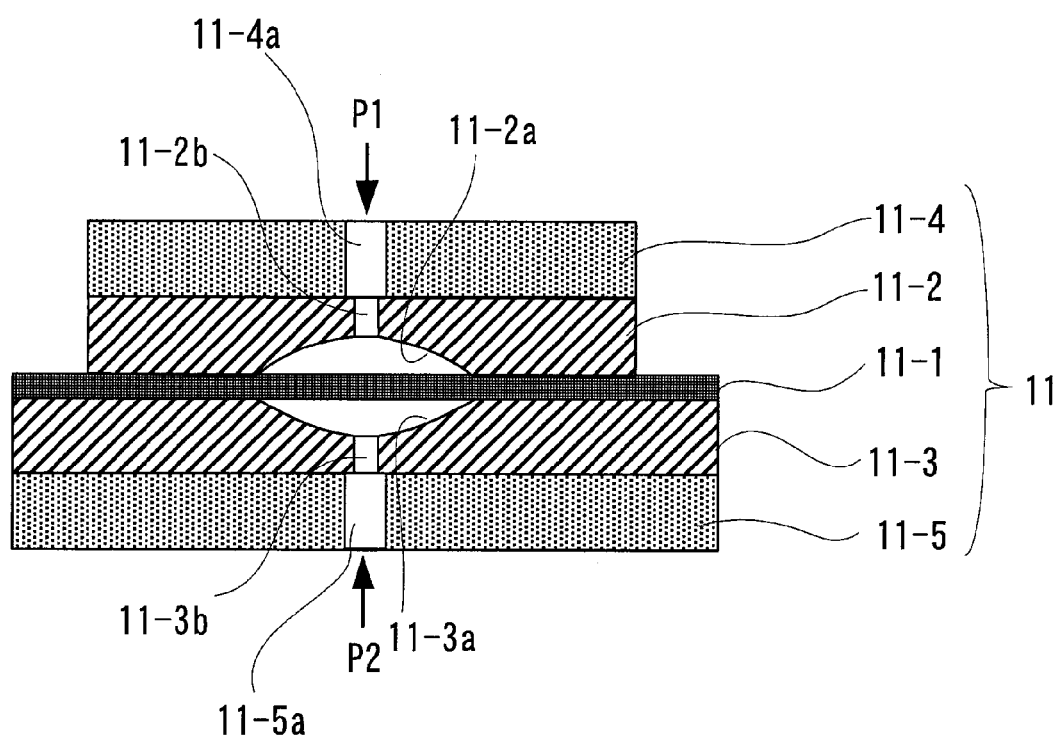
FIG. 5 is a diagram illustrating schematically a pressure sensor chip that uses the structure illustrated in the JP '736.
Figure 6:
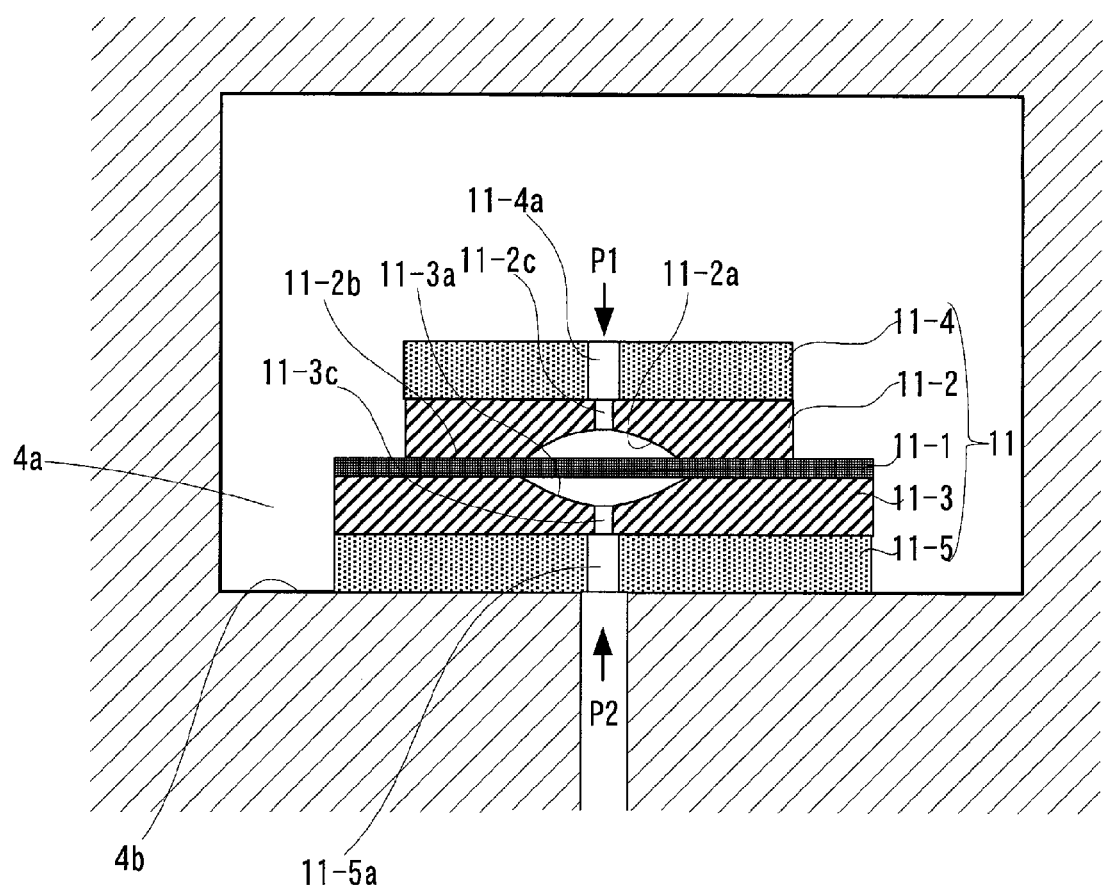
FIG. 6 is a diagram illustrating the state wherein the sensor chip is bonded to the wall face of the sensor chamber of the meter body.

FIG. 2 illustrates schematically Another Example of a differential pressure sensor according to the present invention. In this figure, codes that are the same as those in FIG. 1 indicate identical or equivalent structural elements as the structural elements explained in reference to FIG. 1, and explanations thereof are omitted.

In this differential pressure sensor 200B, one face of the sensor base 13-1 is used as a seat face, and a space 13-1b is formed wherein an opening that connects to a connecting hole 13-1a to the pedestal 11-4 of the sensor chip 11 is wide. Moreover, one face of the sensor base 13-2 is used as a seat face, and a space 13-2b is formed wherein an opening that connects to a connecting hole 13-2a to the pedestal 11-5 of the sensor chip 11 is wide. The other structures are identical to the differential pressure sensor 200A in the Example.

In this differential pressure sensor 200B, the sensor chip 11 bears forces in the compressing direction from both sides from the pressure transmitting medium 16-1 within the space 13-1b of the sensor base 13-1 and from the pressure transmitting medium 16-2 within the space 13-2b of the sensor base 13-2. Because of this, delamination of the bonded portion of the sensor chip 11 is suppressed, further increasing the ability to withstand pressure.

Note that while in the examples set forth above the sensor chips 11 were structured having pedestals 11-4 and 11-5, instead the structure may be one wherein the thicknesses of the stopper members 11-2 and 11-3 are increased, to use them also as the pedestals.

Moreover, while in the examples set forth above ring-shaped grooves 12-2d (12-2d1 and 12-2d2) and 12-3d (12-3d1 and 12-3d2) were provided in the barrier bases 12-2 and 12-3, to cause the barrier bases 12-2 and 12-3 to act as pseudo-diaphragms for changes in volume due to expansion or contraction of the pressure transmitting media 16-1 and 16-2, the barrier bases 12-2 and 12-3 may be caused to work as pseudo-diaphragms using a different method instead. Moreover, if used in an environment wherein there is no risk that there will be expansion or contraction of the pressure transmitting media 16-1 and 16-2, then the structure need not be one wherein the barrier bases 12-2 and 12-3 are caused to work as pseudo-diaphragms.

Moreover, while in the examples set forth above the sensor diaphragm 11-1 was of a type wherein a strain resistance gauge was formed wherein there is a change in resistance value in accordance with the change in pressure, the sensor chip may be of an electrostatic capacitance type instead. An electrostatic capacitance sensor chip comprises a substrate that is provided with a specific space (a capacitance chamber), a diaphragm that is provided on the space of the substrate, a stationary electrode that is formed on the substrate, and a movable electrode that is formed on the diaphragm. When the diaphragm deforms due to the application of pressure, the distance between the movable electrode and the stationary electrode changes, causing a change in the electrostatic capacitance over that space.

Extended Examples

While the present invention has been explained above in reference to the examples, the present invention is not limited to the examples set forth above. The structures and details in the present invention may be varied in a variety of ways, as can be understood by one skilled in the art, within the scope of technology in the present invention.

The invention claimed is:
1. A differential pressure sensor comprising:
 a sensor chip provided with at least
  a sensor diaphragm that outputs a signal in accordance with a difference in pressures borne by a first face and a second face,
  a first retaining member, bonded facing a peripheral edge portion of the first face of the sensor diaphragm, and having a first pressure guiding hole that guides a first fluid pressure to the first face of the sensor diaphragm, and
  a second retaining member, bonded facing a peripheral edge portion of the second face of the sensor diaphragm, and having a second pressure guiding hole that guides a second fluid pressure to the second face of the sensor diaphragm; and
 a sensor housing having
  a sensor chamber containing the sensor chip,
  a first pressure guiding duct that guides the first fluid pressure to a first inner wall face of the sensor chamber, and
  a second pressure guiding duct that guides the second fluid pressure to a second inner wall face of the sensor chamber, the differential pressure sensor further comprising:
 a first connecting member, connected to the first face of the sensor chip, having a first connecting hole that is connected to the first pressure guiding hole;

a second connecting member, connected to the second face of the sensor chip, having a second connecting hole that is connected to the second pressure guiding hole;

a first pressure guiding tube, having one end that is secured in the first connecting hole of the first connecting member, and the other end secured in the first pressure guiding duct of the sensor housing; and a second pressure guiding tube, having one end that is secured in the second connecting hole of the second connecting member, and the other end secured in the second pressure guiding duct of the sensor housing, wherein a first pressure transmitting medium, which guides the first fluid pressure to the one side of the sensor diaphragm, is sealed in the tube of the first pressure guiding tube, as a portion of a sealed chamber, a second pressure transmitting medium, which guides the second fluid pressure to the other side of the sensor diaphragm, is sealed in the tube of the second pressure guiding tube, as a portion of a sealed chamber, a first space of the first connecting member connecting to the first connecting hole to the first face of the sensor chip, wherein the first space is wider than an opening of the first pressure guiding hole, and a second space of the second connecting member connecting to the second connecting hole to the second face of the sensor chip, wherein the second space is wider than an opening of the second pressure guiding hole.

2. The differential pressure sensor as set forth in claim 1, wherein the sensor housing comprises:

a first wall face member that provides the first inner wall face of the sensor chamber; and a second wall face member that provides the second inner wall face of the sensor chamber, wherein the first and second wall face members, when the first and second pressure transmitting media expand or contract so as to change the volume of the media, dislocate in directions that mitigate the production of stress due to the change in volume of the media.

3. The differential pressure sensor as set forth in claim 1, comprising:

a first pressure bearing diaphragm that bears, and transmits to the first pressure transmitting medium, the first fluid pressure; and a second pressure bearing diaphragm that bears, and transmits to the second pressure transmitting medium, the second fluid pressure, wherein the first and second pressure bearing diaphragms are provided on an outer peripheral face of the sensor housing.

4. The differential pressure sensor as set forth in claim 1, wherein, the first space transmits a first force from the first pressure transmitting medium to the sensor chip;

the second space transmits a second force from the second pressure transmitting medium to the sensor chip; and the first and second forces counteract each other to increase a pressure resistance of the sensor chip.

\* \* \* \* \*